(12) United States Patent
Saito et al.

(10) Patent No.: US 11,333,353 B2
(45) Date of Patent: May 17, 2022

(54) BURNER AND METHOD FOR HEATING USING BURNER

(71) Applicant: TAIYO NIPPON SANSO CORPORATION, Tokyo (JP)

(72) Inventors: Takeshi Saito, Tokyo (JP); Yasuyuki Yamamoto, Tokyo (JP); Masashi Yamaguchi, Tokyo (JP); Yoshiyuki Hagihara, Tokyo (JP); Naoki Seino, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 270 days.

(21) Appl. No.: 16/634,302

(22) PCT Filed: Jul. 10, 2018

(86) PCT No.: PCT/JP2018/025971
§ 371 (c)(1),
(2) Date: Jan. 27, 2020

(87) PCT Pub. No.: WO2019/044182
PCT Pub. Date: Mar. 7, 2019

(65) Prior Publication Data
US 2020/0158333 A1    May 21, 2020

(30) Foreign Application Priority Data
Aug. 30, 2017   (JP) .............. JP2017-165630

(51) Int. Cl.
*F23D 14/84*   (2006.01)
*B21B 37/74*   (2006.01)
*F23D 14/22*   (2006.01)

(52) U.S. Cl.
CPC .............. *F23D 14/84* (2013.01); *B21B 37/74* (2013.01); *F23D 14/22* (2013.01);
(Continued)

(58) Field of Classification Search
CPC ....... F23D 14/22; F23D 14/84; F23D 2213/00
(Continued)

(56) References Cited

U.S. PATENT DOCUMENTS 5,110,285 A * 5/1992 Snyder ............... F23D 14/32
  431/8
6,062,848 A * 5/2000 Lifshits ............... F23C 6/045
  239/407

FOREIGN PATENT DOCUMENTS

CN    202779751        3/2013
CN    10-3380328 A     10/2013
(Continued)

OTHER PUBLICATIONS

Office Action dated Jun. 15, 2021 issued in Taiwanese Application No. 107124292 with English translation (8 pages).
(Continued)

*Primary Examiner* — Vivek K Shirsat
(74) *Attorney, Agent, or Firm* — Nixon & Vanderhye P.C.

(57) ABSTRACT

The object of the present invention is to provide a burner which is capable of decreasing the amount of NOx emission and heating the object to be heated uniformly with excellent heat transfer efficiency when heating the object to be heated while oscillating the flame by self-induced oscillation, and a method for heating using a burner, and the present invention provides a burner including a center fluid ejection outlet 2 having a sectional fan shape in which an interval between a pair of side walls 63a and 63b gradually expands toward a downstream side, a pair of openings 62a and 62b provided on side walls 61 of a fluid ejection flow path 6 on an upstream side of the central fluid ejection port 2 and communicated by a communication pipe 7, a first peripheral fluid ejection outlet arranged around the center fluid ejection outlet, a second peripheral fluid ejection outlet is arranged at a position at which a distance between a center thereof and
(Continued)

a center of the center fluid ejection outlet is larger than a distance between a center of the first peripheral fluid ejection outlet and the center of the center fluid ejection outlet, and in a direction orthogonal to an expanding direction of the center fluid ejection outlet, and a third peripheral fluid ejection outlet is arranged at a position at which a distance between a center thereof and the center of the center fluid ejection outlet is larger than the distance between the center of the second peripheral fluid ejection outlet and the center of the center fluid ejection outlet, and in the direction orthogonal to the expanding direction of the center fluid ejection outlet.

4 Claims, 6 Drawing Sheets

(52) U.S. Cl.
CPC ............... *F23D 2213/00* (2013.01); *F23D 2900/14003* (2013.01); *F23D 2900/14482* (2013.01)

(58) Field of Classification Search
USPC ............................................ 431/8, 187, 175
See application file for complete search history.

(56) References Cited

FOREIGN PATENT DOCUMENTS

| | | |
|---|---|---|
| CN | 104748568 | 7/2015 |
| JP | 2005-113200 | 4/2005 |
| JP | 2008-513721 | 5/2008 |
| JP | 2013-079753 | 5/2013 |
| JP | 2013-534611 | 9/2013 |
| WO | 2006/031163 | 3/2006 |
| WO | 2012/009343 | 1/2012 |

OTHER PUBLICATIONS

Office Action issued in CN App. No. 201880049360.7 (dated Mar. 31, 2021) (w/ partial translation).
International Search Report for PCT/JP2018/025971 dated Aug. 7, 2018, 4 pages.

* cited by examiner

BURNER AND METHOD FOR HEATING USING BURNER

This application is the U.S. national phase of International Application No. PCT/JP2018/025971 filed Jul. 10, 2018 which designated the U.S. and claims priority to JP Patent Application No. 2017-165630 filed Aug. 30, 2017, the entire contents of each of which are hereby incorporated by reference.

FIELD OF THE INVENTION

The present invention relates to a burner and a method for heating using a burner.

DESCRIPTION OF RELATED ART

In general, in an iron producing process, an intermediate product (billet, bloom, or slab) is heated to about 1,200° C. using a heating furnace, then transported to a rolling process and processed into a final product. At this time, in a direct-firing type heating furnace, a burner is installed in the furnace, and an object to be heated is heated by a flame formed by the burner. In this way, by adopting a so-called direct-firing type structure in which a flame is directly introduced into the furnace, the calorie efficiency can be increased compared with, for example, an indirect-firing type heating furnace using a radiant tube burner or the like.

On the other hand, the direct-firing type heating furnace has a problem that surface oxidation of the intermediate product occurs due to oxygen contained in the combustion gas, or the like of the flame. The surface of the intermediate product is oxidized and becomes scale, so that the yield of the final product is lowered. Therefore, in the direct-firing heating furnace, a method is generally employed in which a burner is arranged in parallel to the intermediate product and the intermediate product is heated by radiant heat transfer of the flame.

However, when a conventional burner is arranged and used in the heating furnace, the efficiency of the radiant heat transfer is low because the burner is specialized for convective heat transfer. Therefore, when the burner is arranged in parallel to the intermediate product, there is a problem that the heat transfer efficiency is lowered compared with the conventional case and the yield is lowered.

In addition, when oxygen-enriched combustion is performed using the burner of Patent Document 1, the amount of NOx emissions increases. For this reason, it is necessary to suppress the amount of NOx emission so as to be equal to or lower than the reference value of the Air Pollution Control Law applied to the heating furnace.

The amount of the radiant heat transfer changes depending on the temperature difference and the relative distance between the flame and the object to be heated. For this reason, for example, when heating is performed with only one burner using a long intermediate product such as a billet as an object to be heated, uneven heating occurs, and it becomes difficult to perform a normal rolling process in the subsequent rolling process. In order to solve this problem, in the radiant heat transfer type heating furnace, a plurality of burners are arranged in parallel to uniformly heat the intermediate product. However, since the number of burners increases, there is a problem that the apparatus cost increases and the maintainability decreases.

In order to solve the heating unevenness, it has been proposed to oscillate the flame by using a so-called self-induced oscillation phenomenon of a jet flow (for example, see Patent Documents 1 and 2).

The burners disclosed in Patent Documents 1 and 2 have a nozzle structure that applies a self-induced oscillation phenomenon in which the jet flow periodically changes without requiring an external driving force. Thereby, since a flame direction can be changed periodically, it becomes possible to perform uniform heating while maintaining high heat transfer efficiency.

Compared with the conventional radiant tube burner, and the like, it becomes possible for the burners of patent documents 1 and 2 to heat a wide range uniformly. Therefore, when the burners of Patent Documents 1 and 2 are applied to the above heating, effects such as reduction in apparatus cost and improvement in heating uniformity can be expected.

PRIOR ART DOCUMENTS

Patent Literature

Patent Document 1: Japanese Unexamined Patent Application, First Publication No. 2005-113200
Patent Document 2: Japanese Unexamined Patent Application, First Publication No. 2013-079753

DISCLOSURE OF THE INVENTION

Problem to be Solved by the Invention

However, when the oxygen-enriched combustion with a combustion-supporting gas is performed using the burner to which the self-induced oscillation phenomenon described in Patent Documents 1 and 2 is applied, the fuel gas undergoes self-induced oscillation. Therefore, it may be difficult to mix the fuel gas and the combustion-supporting gas with an optimal balance between the flow rate and the flow velocity. In such a case, compared with a conventional burner, the amount of NOx emissions increases, and it is necessary to suppress the amount of NOx emissions so as to be equal to or lower than the reference value of the Air Pollution Control Law applied to the heating furnace.

In addition, when the fuel gas and the combustion-supporting gas are not properly mixed, especially when the object to be heated is placed at a position away from the center axis of the burner, the heat transfer efficiency due to radiant heat transfer is reduced. Therefore, there is a possibility that the object to be heated cannot be heated uniformly.

Here, in order to promote mixing of the fuel gas and the combustion-supporting gas and to improve the convective heat transfer efficiency, for example, it is conceivable to increase the oscillation velocity of the flame. However, when the oscillation velocity of the flame is increased, there is a problem that the flame length is shortened and the object to be heated cannot be heated uniformly.

The present invention has been made in view of the above-described problems. The object of the present invention is to provide a burner which is capable of decreasing the amount of NOx emission and heating the object to be heated uniformly with excellent heat transfer efficiency when heating the object to be heated while oscillating the flame by self-induced oscillation, and a method for heating using a burner.

Means to Solve the Problem

In order to achieve the above object, the present invention provides the following burners.

(1) A burner which is configured eject a combustion-supporting gas containing oxygen or a fuel gas from each of a plurality of fluid ejection outlets provided at the tip surface thereof, and burns them, wherein a plurality of the fluid ejection outlets include a center fluid ejection outlet, a first peripheral fluid ejection outlet, a second peripheral fluid ejection outlet, and a third peripheral fluid ejection outlet, a pair of openings are provided at positions facing each other on side walls of a fluid ejection flow path on an upstream side of the center fluid ejection outlet, a pair of the openings are communicated with each other through a communication pipe, a downstream side of the opening in the fluid ejection flow path has a cross-sectional fan shape in which an interval between a pair of the side walls at which the openings are arranged gradually expands toward the downstream side, the first peripheral fluid ejection outlet is arranged around the center fluid ejection outlet, the second peripheral fluid ejection outlet is arranged at a position at which a distance between a center thereof and a center of the center fluid ejection outlet is larger than a distance between a center of the first peripheral fluid ejection outlet and the center of the center fluid ejection outlet, and in a direction orthogonal to an expanding direction of the center fluid ejection outlet, and the third peripheral fluid ejection outlet is arranged at a position at which a distance between a center thereof and the center of the center fluid ejection outlet is larger than the distance between the center of the second peripheral fluid ejection outlet and the center of the center fluid ejection outlet, and in the direction orthogonal to the expanding direction of the center fluid ejection outlet.

(2) The burner according to (1), wherein when an equivalent diameter of the center fluid ejection outlet is L, a center-to-center distance from the center fluid ejection outlet to the second peripheral fluid ejection outlet is $L_B$, and a center-to-center distance from the second peripheral fluid ejection outlet to the third peripheral fluid ejection outlet is $L_{B-C}$, L, $L_B$, and $L_{B-C}$ satisfy the following expressions (1) and (2).

$$L_B \leq 15L \quad (1)$$

$$L_{B-C} \leq 15L \quad (2)$$

(3) The burner according to (1) or (2), wherein the second peripheral fluid outlet and the third peripheral fluid outlet are arranged respectively in a plurality along the expanding direction of the center fluid ejection outlet.

(4) A method for heating using a burner, wherein an object to be heated is heated using the burner according to any one of (1) to (3), when a fluid ejected from the first peripheral fluid ejection outlet, the second peripheral fluid ejection outlet, and the third peripheral fluid ejection outlet is a peripheral fluid A, a peripheral fluid B, and a peripheral fluid C, when ratios of a flow rate of the peripheral fluids A, B, and C with respect to a total flow rate of the peripheral fluids A, B, and C are $Q_A$, $Q_B$, and $Q_C$, and these ratios are in ranges represented by the following formulas (3), (4) and (5), respectively.

$$Q_A = 0.05 \sim 0.20 \quad (3)$$

$$Q_B = 0.20 \sim 0.80 \quad (4)$$

$$Q_C = 0.20 \sim 0.80 \quad (5)$$

(5) The method for heating using a burner according to (4), wherein when a flow velocity of a center fluid D ejected from the center fluid ejection outlet is V, and flow velocities of the peripheral fluids B and C ejected from the second peripheral fluid ejection outlet and the third peripheral fluid ejection outlet are $V_B$ and $V_C$, V, $V_B$, and $V_C$ satisfy the following formula (6).

$$V \leq V_B \leq V_C \leq 8V \quad (6)$$

Effects of the Invention

A burner according to the present invention includes a center fluid ejection outlet, a first peripheral fluid ejection outlet arranged around the center fluid ejection outlet, a second peripheral fluid ejection outlet arranged at a position at which a distance between a center thereof and a center of the center fluid ejection outlet is larger than a distance between a center of the first peripheral fluid ejection outlet and the center of the center fluid ejection outlet, and in a direction orthogonal to the expanding direction of the center fluid ejection outlet, and a third peripheral fluid ejection outlet arranged at a position at which a distance between a center thereof and the center of the center fluid ejection outlet is larger than the distance between the center of the second peripheral fluid ejection outlet and the center of the center fluid ejection outlet, and in the direction orthogonal to the expanding direction of the center fluid ejection outlet.

Thus, in the burner that oscillates a flame by self-induced oscillation, in addition to the center fluid ejection outlet and the first peripheral fluid ejection outlet arranged around the center fluid ejection outlet, the second peripheral fluid ejection outlet and the third peripheral fluid ejection outlet are provided at an optimized position. Thereby, the center fluid and the peripheral fluid can be mixed and combusted in stages. As a result, the flow rate and the flow velocity of each peripheral fluid ejected from the first to third peripheral flow ejection outlets can be adjusted to an optimal balance, so that a good combustion state can be maintained, and the heat transfer efficiency can be improved. In addition, even when the oscillation of the flame due to the self-induced oscillation is accelerated, the length of the flame to be formed can be ensured.

Therefore, when heating an object to be heated, it is possible to suppress the amount of NOx emission and to heat the wide area uniformly even at a position away from the center axis of the burner.

Moreover, since the method for heating using a burner according to the present invention is the method for heating using the burner, uniform heating can be achieved over a wide area. Furthermore, even when the object to be heated is arranged at a position away from the center axis of the burner, uniform heating can be performed with excellent heat transfer efficiency.

BRIEF DESCRIPTION OF DRAWINGS

FIG. 3 is a diagram schematically showing the burner according to the embodiment of the present invention.

DETAILED DESCRIPTION OF THE INVENTION

Figure 1:
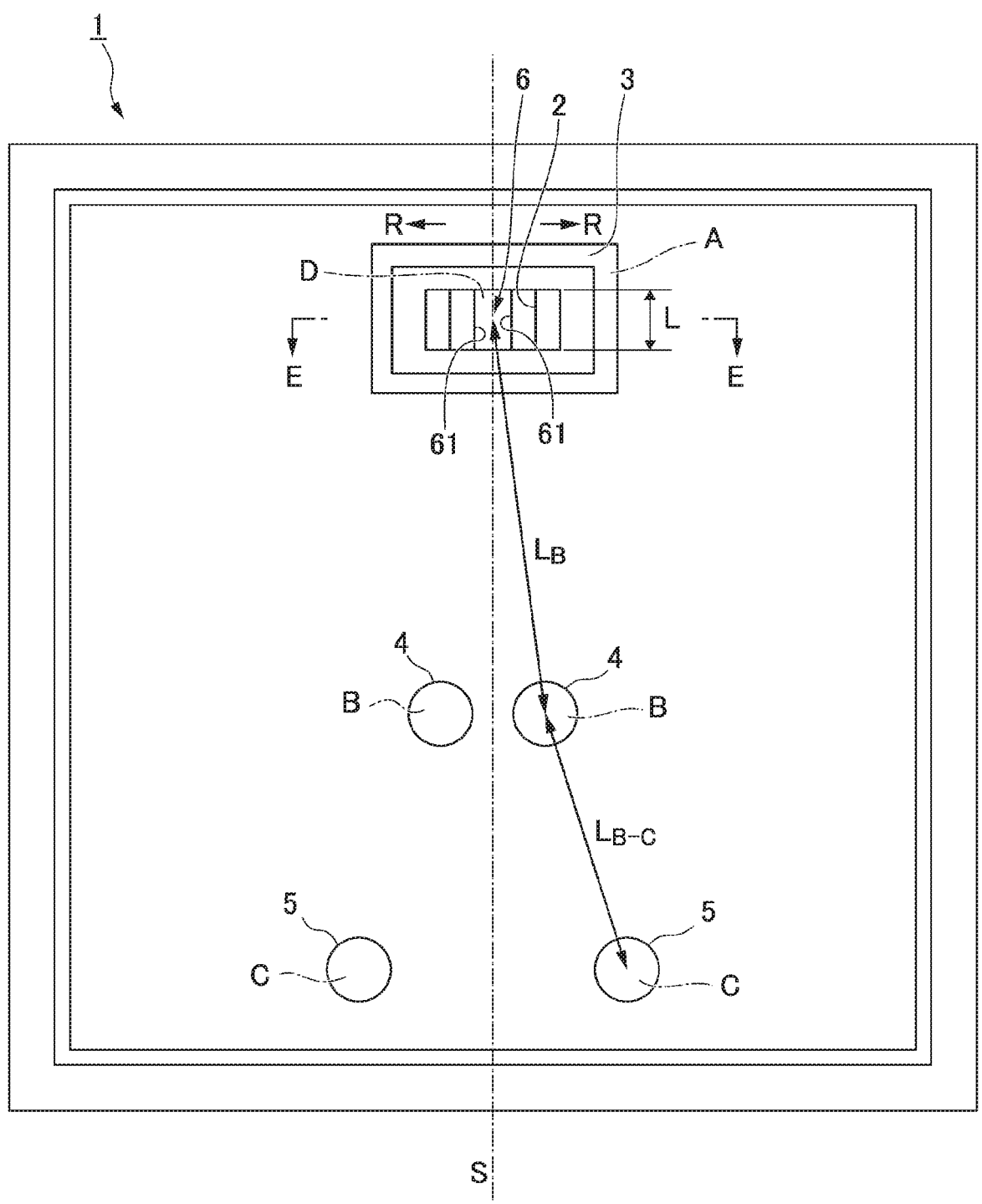
FIG. 1 is a diagram schematically showing a burner according to an embodiment of the present invention, and is a plan view showing an example of a positional relationship between a center fluid ejection outlet and each peripheral fluid ejection outlet.

Hereinafter, a burner and a method for heating using a burner which is an embodiment according to the present invention will be described with reference to FIGS. 1 to 6 as appropriate. In the drawings used in the following description, in order to make the features easy to understand, the features may be enlarged for the sake of convenience, and the dimensional ratio of each component may be limited to the same as the actual one. In addition, the materials and the like exemplified in the following description are merely examples, and the present invention is not necessarily limited to them, and can be appropriately changed and implemented without changing the gist of the invention.

A burner and a method for heating using a burner according to the present invention can be used for, for example, heating an intermediate product (billet, bloom or slab) to about 1,200° C. using a heating furnace in an iron producing process.

<Burner>

Hereinafter, the structure of the burner and the method for heating using a burner according to the present invention will be described in detail.

[Structure of Burner]

Figure 2:
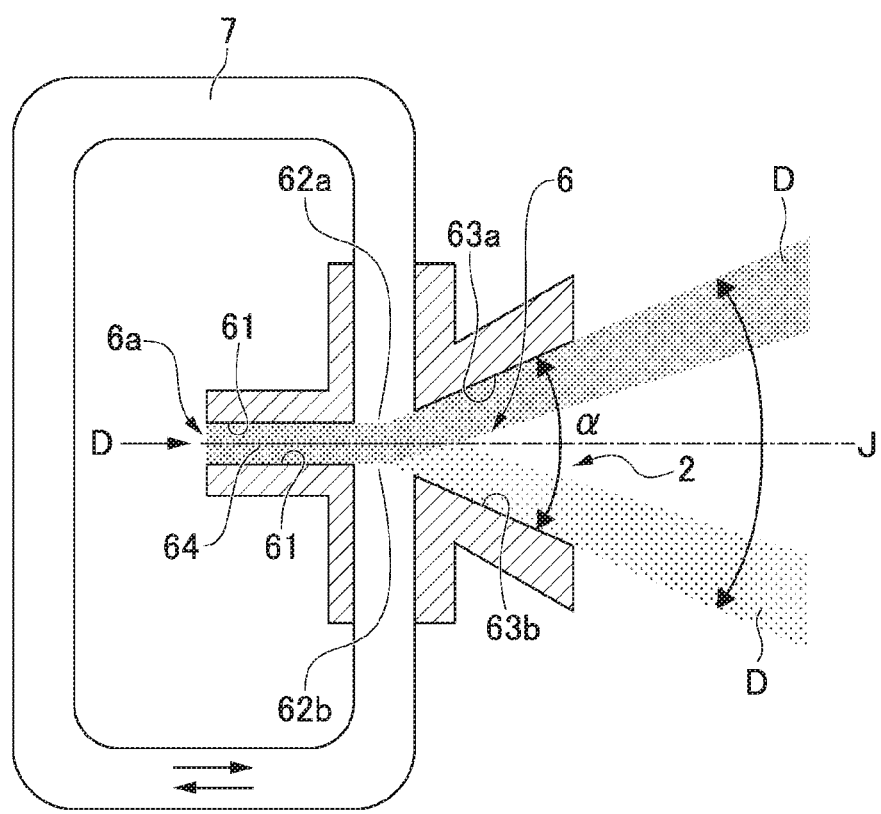
FIG. 2 is a diagram schematically showing the burner according to the embodiment of the present invention, and is a cross-sectional view of the burner taken along line E-E shown in FIG. 1.
Figure 3A:
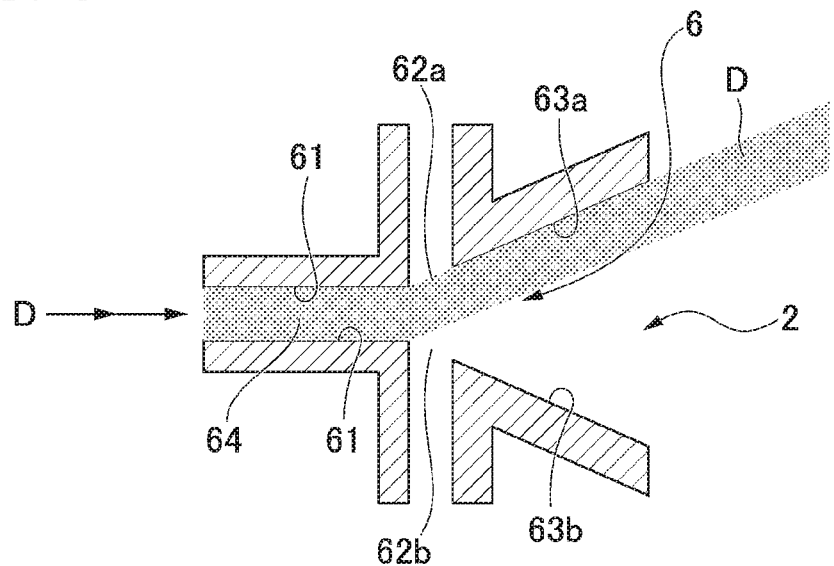
FIGS. 3A and 3B are conceptual diagrams showing the oscillation state of the ejection direction of the center fluid in the burner shown in FIGS. 1 and 2.
Figure 3B:
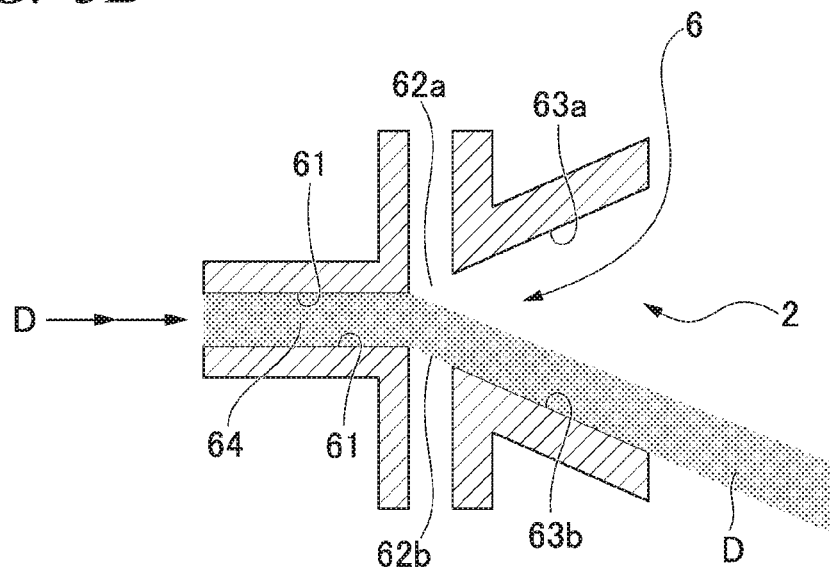
Figure 4:
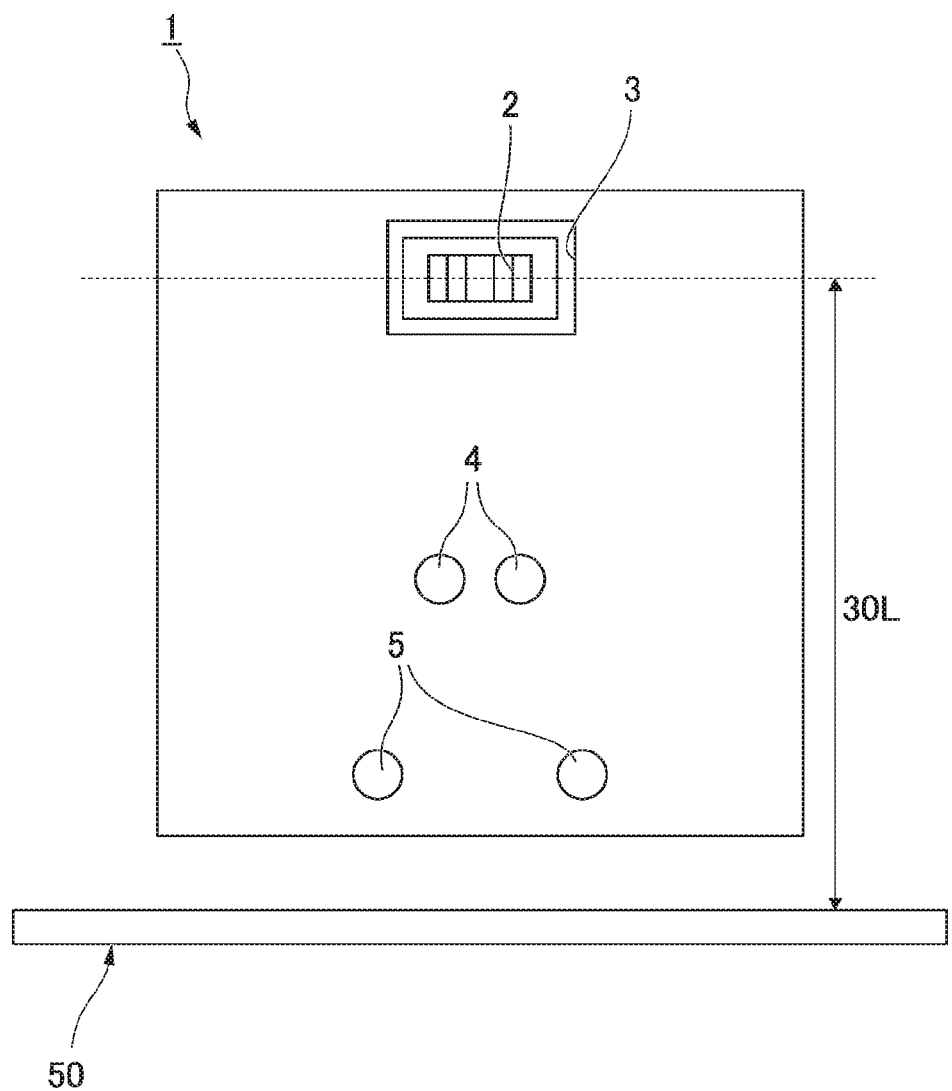
FIG. 4 is a diagram schematically showing a burner according to another embodiment of the present invention, and is a schematic diagram showing an example of a positional relationship between the burner and an object to be heated.

FIGS. 1 to 4 are diagrams for explaining the structure of a burner 1 according to an embodiment of the present invention. FIG. 1 is a plan view showing an example of the positional relationship between the center fluid ejection outlet and each peripheral fluid ejection outlet. FIG. 2 is a cross-sectional view (transverse cross-sectional view) of the burner shown in FIG. 1 when the burner 1 is cut by the line E-E shown in FIG. 1. FIG. 3 is a diagram showing a oscillation state of the fluid ejection direction in the burner 1 according to the embodiment of the present invention. FIG. 4 is a schematic diagram showing an example of the positional relationship between the burner and the object to be heated. In addition, since FIGS. 1 to 4 are schematic diagrams showing the arrangement relation and size of each fluid ejection outlet and opening, and the like, some of the detailed parts such as walls are not shown in FIGS. 1 to 4 (and FIG. 5 described in Example).

As shown in FIGS. 1 to 4, the burner 1 according to the present embodiment ejects at least one of a combustion-supporting gas and a fuel gas from each of a plurality of fluid ejection outlets provided at the tip surface of the burner 1, and burns them.

Specifically, as shown in FIG. 1, the burner 1 of the present embodiment includes a plurality of fluid ejection outlets, such as a center fluid ejection outlet 2, a first peripheral fluid ejection outlet 3, a second peripheral fluid ejection outlet 4, and a third peripheral fluid ejection outlet 5.

As shown in FIG. 2, a pair of a first opening 62a and a second opening 62b are provided on side walls 61 of the fluid ejection flow path 6 on the upstream side of the center fluid ejection outlet 2 at positions facing each other. A pair of the first and second openings 62a and 62b are communicated with each other through a communication pipe 7.

In addition, the distance between a pair of a first side wall 63a and a second side wall 63b that form the fluid ejection flow path 6 located on the downstream side of the first and second openings 62a and 62b is gradually expanded toward the downstream side (hereinafter, the direction indicating the distance between the first side wall 63a and the second side wall 63b will be referred to as "the expanding direction (of the center fluid ejection outlet 2)). That is, when the burner 1 is viewed from above, the fluid ejection flow path 6 located downstream of the first and second openings 62a and 62b has a fan shape.

The first peripheral fluid ejection outlet 3 is arranged around the center fluid ejection outlet 2.

The second peripheral fluid ejection outlet 4 is arranged at a position at which the distance between the center thereof and the center of the center fluid ejection outlet 2 is larger than the distance between the center of the first peripheral fluid ejection outlet 3 and the center of the center fluid ejection outlet 2, and in the direction orthogonal to the expanding direction of the center fluid ejection outlet 2.

The third peripheral fluid ejection outlet 5 is arranged at a position at which the distance between the center thereof and the center of the center fluid ejection outlet 2 is larger than the distance between the center of the second peripheral fluid ejection outlet 2 and the center of the center fluid ejection outlet 2, and in the direction orthogonal to the expanding direction of the center fluid ejection outlet 2.

Further, as shown in FIG. 1, in the burner 1 of the present embodiment, a plurality of the second peripheral fluid ejection outlets 4 and the third peripheral fluid ejection outlets 5 are arranged along the expanding direction of the center fluid ejection outlet 2. In the present embodiment, two each of the second peripheral fluid ejection outlet 4 and the third peripheral fluid ejection outlet 5 are provided.

In the burner 1 of the present embodiment, the combustion-supporting gas and the fuel gas are separately ejected from the center fluid ejection outlet 2 and the first to third peripheral fluid ejection outlets 3, 4, and 5. However, any gas may be ejected from any ejection outlet.

For example, the fuel gas may be ejected from the center fluid ejection outlet 2, and the combustion-supporting gas may be ejected from the first to third peripheral fluid ejection outlets 3, 4, and 5.

The center fluid ejection outlet 2 is configured as an opening (nozzle) that ejects gas to the outside by supplying the combustion-supporting gas or the fuel gas from the fluid ejection flow path 6 at the upstream side.

As will be described later, the center fluid ejection outlet 2 has a rectangular shape because the cross section of the fluid ejection flow path 6 perpendicular to the fluid (gas) flow direction is substantially rectangular.

By connecting a center fluid supply line (not shown) to an introduction port 6a, either the combustion-supporting gas or the fuel gas is introduced into the fluid ejection flow path 6 and ejected from the center fluid ejection outlet 2.

As described above, the cross section of the fluid ejection flow path 6 in the direction orthogonal to the fluid (gas) flow direction is substantially rectangular. The substantially rectangular side surface is formed by a pair of the side walls 61 and 61 described above. The side walls 61 and 61 are provided with a pair of the first and second openings 62a and 62b so as to face each other. In addition, as shown in FIG. 2, a pair of the first and second openings 62a and 62b are communicated with each other through the communication pipe 7.

As described above, the side surfaces of the fluid ejection flow path 6 located on the downstream side of the first and second openings 62a and 62b is formed by a pair of the first and second side walls 63a and 63b. The interval between the first and second side walls 63a and 63b is gradually expanded toward the downstream side.

The cross section along the fluid (gas) flow direction of the fluid ejection flow path 6 located downstream of the first and second openings 62a and 62b has a fan shape. That is, a pair of the first and second side walls 63a and 63b having a substantially V-shaped cross section along the fluid (gas) flow direction are arranged.

On the other hand, the fluid ejection flow path 6 located on the upstream side of the first and second openings 62a and 62b is formed as a rectangular tube-shaped flow path 64 in which the space between the opposed side walls 61 and 61 extends substantially in parallel. The cross section along the fluid (gas) flow direction is substantially rectangular.

The burner 1 of the present embodiment can generate so-called self-induced oscillation of a flip-flop nozzle in the combustion-supporting gas or the fuel gas ejected from the center fluid ejection outlet 2 by arranging a pair of the first and second openings 62a and 62b to face each other on a pair of the side walls 61 and 61 forming a fluid ejection flow path 6, and connecting a pair of the first and second openings 62a and 62b by the communication pipe 7.

That is, as shown in FIGS. 3A and 3B, when the fluid (the combustion-supporting gas or the fuel gas) flowing from the flow path 64 located upstream of the first and second openings 62a and 62b passes between a pair of the first and second openings 62a, 62b, and flows between a pair of the first and second side walls 63a, 63b having a sectional fan shape, the fluid is ejected from the center fluid ejection outlet 2 while self-induced oscillation so as to alternately contact the first side wall 63a and the second side wall 63b. In addition, an arrow R in FIG. 1 means the self-induced oscillation direction of the fluid.

Note that the amplitude and frequency of the fluid due to the self-induced oscillation vary depending on various conditions such as the dimensions of the first and second openings 62a and 62b, a pair of the first and second side walls 63a and 63b, and the communication pipe 7, and the flow velocity of the fluid.

Therefore, by appropriately setting the dimensions of these portions, the fluid ejected from the center fluid ejection outlet 2 can be oscillated at a desired angle and frequency within a certain range.

As described above, the self-induced oscillation by the flip-flop nozzle can be generated by connecting a pair of the first and second openings 62a and 62b through the communication pipe 7, but it is also possible to generate by providing a pressure control mechanism (not shown) to the communication pipe 7. By providing such a pressure control mechanism, for example, when the pressure of the first opening 62a is lower than the static pressure, the pressure can be alternately reversed so that the pressure of the second opening 62b is higher than the static pressure. Thus, by alternately reversing the pressures of a pair of the first and second openings 62a and 62b, the ejection direction of the fluid (the combustion-supporting gas or the fuel gas) ejected from the center fluid ejection outlet 2 is periodically changed, and the self-induced oscillation explained above can be generated.

More specifically, when the pressure of the first opening 62a is made lower than the static pressure, and the pressure of the second opening 62b arranged at the opposite position is made higher than the static pressure using a pressure control mechanism (not shown), as shown to FIG. 3A, the fluid is ejected while being inclined toward the first side wall 63a.

When the pressure of the first opening 62a is made higher than the static pressure, and the pressure of the second opening 62b is made lower than the static pressure, the fluid is ejected while being inclined toward the second side wall 63b.

The burner 1 of the present embodiment can ejects the fluid from the center fluid ejection outlet 2 by periodically changing the fluid ejection direction by the above-described configuration and operation.

Note that the opening angle of a pair of the first and second side walls 63a and 63b in the fluid ejection flow path 6 shown in FIG. 2, that is, the opening angle α of the center fluid ejection outlet 2 is not particularly limited. What is necessary is just to set in consideration of the opening angle of the flame desired. However, in order to stably generate oscillation in the fluid ejection direction and achieve uniform heating, the opening angle α is preferably 90° or less.

As shown in FIG. 1, the first peripheral fluid ejection outlet 3 is arranged around the center fluid ejection outlet 2 so as to surround the center fluid ejection outlet 2.

The first peripheral fluid ejection outlet 3 is connected to a peripheral fluid supply line not shown in figures, and either the combustion-supporting gas or the fuel gas is introduced. Thereby, the first peripheral fluid ejection outlet 3 is configured as an opening (nozzle) which ejects any gas.

Here, "the first peripheral fluid ejection outlet 3 is arranged around the center fluid ejection outlet 2" means that the first peripheral fluid ejection outlet 3 is arranged so as to surround the center fluid ejection outlet 2, and that the center fluid ejection outlet 2 and the first peripheral fluid ejection outlet 3 are arranged at adjacent positions. By arranging the first peripheral fluid ejection outlet 3 with respect to the center fluid ejection outlet 2 as described above, the combustion-supporting gas can be ejected from a position adjacent to the position at which the fuel gas is ejected.

In the present embodiment, the first peripheral fluid ejection outlet 3 is arranged so as to surround the center fluid ejection outlet 2, so that the center fluid ejected from the center fluid ejection outlet 2 (for example, the fuel gas) and the peripheral fluid (for example, the combustion-supporting gas) ejected from the first peripheral fluid ejection outlet 3 are effectively mixed. In addition, since the fluid is ejected from the first peripheral fluid ejection outlet 3 to the outer periphery of the flame, the reduction region is spread, and the effect of improving the combustion efficiency when forming the flame is obtained.

As shown in FIG. 1, the shape of the first peripheral fluid ejection outlet 3 may be a rectangular shape arranged around the center fluid ejection outlet 2, but is not limited to a rectangular shape, and may be a circular shape. Further, the first peripheral fluid ejection outlet 3 may be configured to surround the center fluid ejection outlet 2 with a plurality of openings (holes).

As described above, the second peripheral fluid ejection outlet 4 is arranged at a position at which the distance between the center thereof and the center of the center fluid ejection outlet 2 is larger than the distance between the center of the first peripheral fluid ejection outlet 3 and the center of the center fluid ejection outlet 2, and in a direction orthogonal to the expanding direction of the center fluid ejection outlet 2. In other words, the second peripheral fluid ejection outlet 4 is provided on the outer peripheral side of the first peripheral fluid ejection outlet 3 and in a direction orthogonal to the expanding direction of the center fluid ejection outlet 2.

Further, the second peripheral fluid ejection outlet 4 is arranged in a direction orthogonal to the expanding direction of the center fluid ejection outlet 2, in the example shown in FIG. 1, the second peripheral fluid ejection outlet 4 is arranged below the first peripheral fluid ejection outlet 3 (lower side in the longitudinal direction in FIG. 1). That is, the second peripheral fluid ejection outlet 4 is arranged in a direction orthogonal to the self-induced oscillation direction of the center fluid ejected from the center fluid ejection outlet 2. Further, a plurality of the second peripheral fluid ejection outlets 4 are arranged along the expanding direction of the center fluid ejection outlet 2. In the example shown in FIG. 1, two second peripheral fluid ejection outlets 4 are equally arranged via a center line S orthogonal to the expanding direction of the center fluid ejection outlet 2.

The shape of the second peripheral fluid ejection outlet 4 is not particularly limited, but may be, for example, a slit shape or a rectangular shape in addition to the circular shape shown in FIG. 1.

The third peripheral fluid ejection outlet 5 is arranged at a position at which the distance between the center thereof and the center of the center fluid ejection outlet 2 is larger than the distance between the center of the second peripheral fluid ejection outlet 4 and the center of the center fluid ejection outlet 2. In addition, the third peripheral fluid ejection outlet 5 are arranged in the direction orthogonal to the expanding direction of the center fluid ejection outlet 2. In the example shown in FIG. 1, the third peripheral fluid ejection outlet 5 is arranged below the second peripheral fluid ejection outlet 4 (lower side in the longitudinal direction in FIG. 1).

That is, the third peripheral fluid ejection outlet 5 is arranged in a direction orthogonal to the self-induced oscillation direction of the center fluid ejected from the center fluid ejection outlet 2, similarly to the second peripheral fluid ejection outlet 4.

Similarly to the second peripheral fluid ejection outlet 4, the third peripheral fluid ejection outlet 5 is arranged in a plurality along the expanding direction of the center fluid ejection outlet 2. In the example shown in FIG. 1, two third peripheral fluid ejection outlets 5 are equally arranged via the center line S of the center fluid ejection outlet 2.

The shape of the third peripheral fluid ejection outlet 5 is not particularly limited similar to the second peripheral fluid ejection outlet 4, but may be, for example, a slit shape or a rectangular shape in addition to the circular shape shown in in FIG. 1.

Here, the second peripheral fluid ejection outlet 4 and the third peripheral fluid ejection outlet 5 are preferably opened between the center fluid ejection outlet 2 and an object 50 to be heated described later, as shown in FIG. 4.

By arranging the second peripheral fluid ejection outlet 4 and the third peripheral fluid ejection outlet 5 as described above, the peripheral fluids A, B, and C ejected from the first peripheral fluid ejection outlet 3, the second peripheral fluid ejection outlet 4, and the third peripheral fluid ejection outlet 5, respectively, can be mixed in a stepwise manner with the center fluid D ejected from the center fluid ejection outlet 2, and combust.

In the present embodiment, by mixing and combusting the center fluid D and the peripheral fluids A, B, and C, that is, by mixing and combusting the fuel gas and the combustion-supporting gas are performed as described above, the flame length can be extended and the flame can be formed at a position close to object to be heated.

In addition, the second peripheral fluid ejection outlet 4 and the third peripheral fluid ejection outlet 5 are provided in two places in the example shown in FIGS. 1 and 4. However, the number of these arrangements is not particularly limited, and can be appropriately determined in consideration of, for example, the flow velocity or flow rate of the fuel gas or the combustion-supporting gas.

In the burner 1 of the present embodiment, the intervals between the center fluid ejection outlet 2, the first peripheral fluid ejection outlet 3, the second peripheral fluid ejection outlet 4, and the third peripheral fluid ejection outlet 5 are not particularly limited and can be appropriately determined in consideration of, for example, the flow velocity or flow rate of the fuel gas or the combustion-supporting gas.

On the other hand, in the present embodiment, as shown in FIG. 1, when the equivalent diameter of the center fluid ejection outlet 2 is L, the center-to-center distance from the center fluid ejection outlet 2 to the second peripheral fluid ejection outlet 4 is $L_B$, and the center-to-center distance from the second peripheral fluid ejection outlet 4 to the third peripheral fluid ejection outlet 5 is $L_{B-C}$, it is more preferable that these relationships satisfy the following expressions (1) and (2).

$$L_B \leq 15L \quad (1)$$

$$L_{B-C} \leq 15L \quad (2)$$

As described above, by setting the center-to-center distance $L_B$ between the center fluid ejection outlet 2 and the second peripheral fluid ejection outlet 4 and the center-to-center distance $L_{B-C}$ between the second peripheral fluid ejection outlet 4 and the third peripheral fluid ejection outlet 5 to 15 times or less the equivalent diameter L of the center fluid ejection outlet 2, the distance between the peripheral fluid ejection outlets with respect to the size of the center fluid ejection outlet 2 becomes an optimum range.

That is, by optimizing the distance between the center fluid ejection outlet 2 and the second peripheral fluid ejection outlet 4 and the distance between the second peripheral fluid ejection outlet 4 and the third peripheral fluid ejection outlet 5, when each of the peripheral fluids A, B, and C (for example, the combustion-supporting gas) is sequentially mixed in a stepwise manner with the center fluid D (for example, the fuel gas), the fluids are mixed in a balance that optimizes the flow rate and flow velocity of each fluid. As a result, the effect of extending the flame length as described above can be obtained more remarkably, and the flame can be formed at a position closer to the object to be heated.

When the center-to-center distance $L_B$ and the center-to-center distance $L_{B-C}$ exceed 15 times the equivalent diameter L of the center fluid ejection outlet 2, the distance between the center fluid ejection outlet 2 and the second peripheral fluid ejection outlet 4, and the distance between the second peripheral fluid ejection 4 and the third peripheral fluid ejection outlet 5 is too large for the size of center fluid ejection outlet 2. For this reason, when each peripheral fluid (for example, the combustion-supporting gas) is mixed with the center fluid (for example, the fuel gas) sequentially in a stepwise manner, the fluid cannot be mixed while maintaining an optimal balance between the flow rate and flow velocity of each fluid, and the effect of extending the flame length is difficult to obtain. Further, it may be difficult to form a flame at a position close to object to be heated 50.

The equivalent diameter L of the center fluid ejection outlet 2 refers to the opening size of the center fluid ejection outlet 2 in a direction orthogonal to the expanding direction of the center fluid ejection outlet 2 as shown in FIG. 1.

Note that in the burner of the present embodiment, it is preferable that the amount of the center fluid D ejected from the center fluid ejection outlet 2 and the amount of each of the peripheral fluids A, B, and C ejected from the first peripheral fluid ejection outlet 3, the second peripheral fluid ejection outlet 4, and the third peripheral fluid ejection outlet 5 can be individually controlled. Although detailed illustration is omitted as a method for individually controlling the amount of each fluid ejected, for example, a method of providing a flow rate control device in each line which is connected to each ejection outlet and supplies each fluid is mentioned.

[Method for Combusting in Burner]

Next, a method for combusting the burner 1 of the present embodiment having the above configuration will be described.

Although the detailed illustration is omitted, the burner 1 of the present embodiment uses the fuel gas as the center fluid D ejected from the center fluid ejection outlet 2, and the combustion-supporting gas as the peripheral fluid A, B, and C ejected from the first peripheral fluid ejection outlet 3, the second peripheral fluid ejection outlet 4, and the third peripheral fluid ejection outlet 5, and forms a flame in the ejection direction of the fuel gas (the center fluid D).

Examples of the fuel gas include natural gas (LNG), but liquid fuel such as heavy oil may be used.

Examples of the combustion-supporting gas include a mixed gas of oxygen and air. As the mixed gas, for example, nitrogen gas, carbon dioxide gas, exhaust gas, or the like may be used instead of the air, and this may be mixed with oxygen. Moreover, as oxygen used for the mixed gas, industrial pure oxygen may be used.

When combusting the burner 1 of the present embodiment, as described above, the fuel gas ejected from the center fluid ejection outlet 2 is ejected while alternately and periodically changing the ejection direction by self-induced oscillation (FIGS. 3A and 3B). At this time, the combustion-supporting gas (peripheral fluid A) is ejected toward the fuel gas (center fluid D) ejected from the center fluid ejection outlet 2 at a periodically changing angle from the first peripheral fluid ejection outlet 3 so as to wrap the fuel gas and contributes to the formation of the flame.

Then, the combustion-supporting gas (peripheral fluid B) is ejected from the second peripheral fluid ejection outlet 4, and further the combustion-supporting gas (peripheral fluid C) is ejected from the third peripheral fluid ejection outlet 5 toward the flame.

As described above, the peripheral fluids A, B, and C, which are the combustion-supporting gases, are sequentially ejected toward the center fluid D, which is the fuel gas, so that the combustion efficiency is improved, and the amount of NOx emissions can be effectively reduced. Moreover, the heat transfer efficiency by the flame is improved and it becomes possible to heat the object to be heated 50 (refer FIG. 4) uniformly.

In addition, the switching period of the ejection direction by the self-induced oscillation of the fuel gas (the center fluid D) ejected from the center fluid ejection outlet 2 is not particularly limited. The switching period can be set as appropriate as long as it can be uniformly heated with excellent heat transfer efficiency even at a position away from the center axis J of the burner 1.

According to the burner 1 of the present embodiment, it is possible to obtain both the effect of heating uniformly in a wide area and the effect of obtaining high heat transfer efficiency up to a position away from the center axis J of the burner by combining a configuration that oscillates the flame by self-induced oscillation and a configuration that optimizes the arrangement of each fluid ejection outlet.

In addition, since the flow rate and flow velocity of the combustion-supporting gas (peripheral fluid A, B, C) ejected from each peripheral fluid ejection outlet 3, 4, 5 can be adjusted to an optimal balance, a good combustion state is maintained, and therefore, it is possible to suppress the amount of NOx emission.

[Method for Heating Using Burner]

A method for heating according to the present invention is a method for heating an object to be heated 50 using the burner 1 according to the present invention having the above-described configuration.

Since the method for heating of the present embodiment is a method for heating an object to be heated using the burner 1, when heating the object to be heated by the flame that oscillates by self-induced oscillation, the amount of NOx emission is suppressed, and even at a position away from the center axis J of the burner 1, it can heat uniformly in a wide area.

Figure 5:
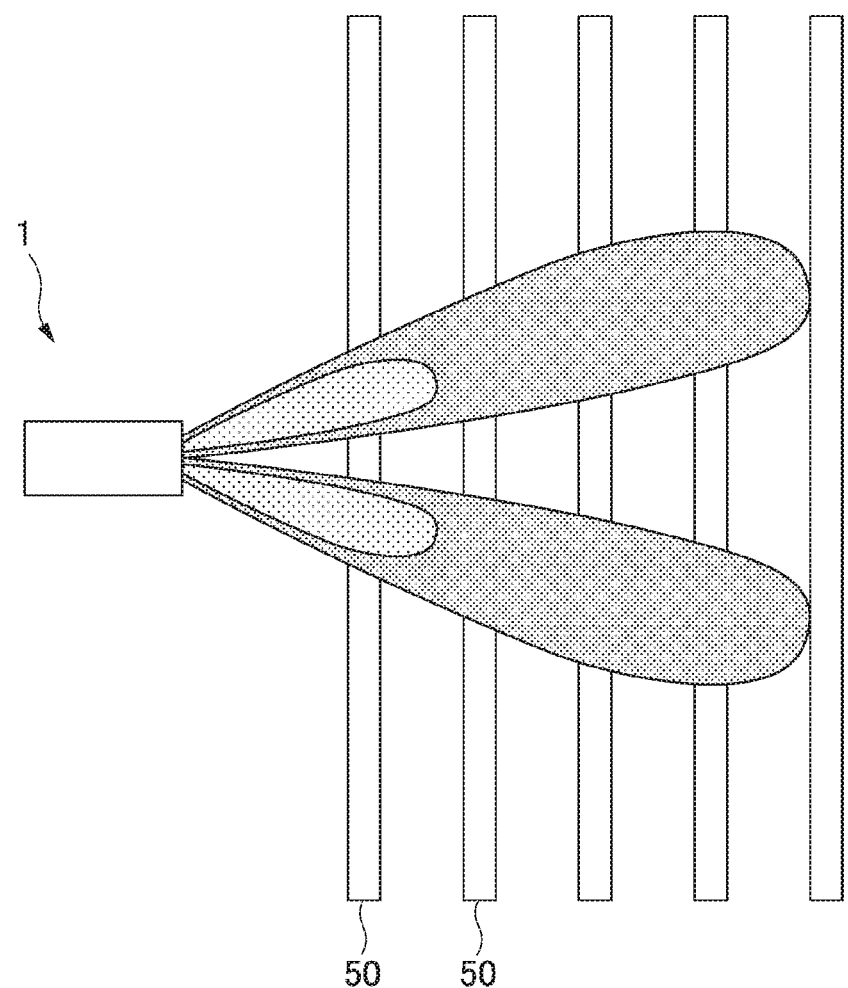
FIG. 5 is a diagram schematically showing a burner and a heating method using a burner according to an embodiment of the present invention, and shows an example of a positional relationship between a flame formed by the burner and an object to be heated from upper direction.

The object to be heated in the method for heating of the present embodiment is not particularly limited. Examples of the object to be heated include intermediate products that need to be heated using a heating furnace in the iron producing process described above, such as billets, blooms, or slabs. In FIG. 5, a prismatic billet is shown as the object to be heated 50.

The method for heating of the present embodiment is a method of heating the object to be heated 50 such as a billet as illustrated in FIGS. 4 and 5 using the burner 1. Accordingly, various object to be heated can be heated uniformly over a wide area, and the high heat transfer efficiency can be obtained up to a position away from the center axis J of the burner (the center axis in the fluid ejection direction). In addition, the amount of NOx emission can be suppressed.

In the method for heating of the present embodiment, when the ratios of the flow rate of the peripheral fluids A, B, and C ejected from the first peripheral fluid ejection outlet 3, the second peripheral fluid ejection outlet 4, and the third peripheral fluid ejection outlet 5 with respect to the total flow rate of the peripheral fluids A, B, and C are $Q_A$, $Q_B$, and $Q_C$, these ratios are preferably in the ranges represented by the following formulas (3), (4) and (5), respectively.

$$Q_A = 0.05 \sim 0.20 \quad (3)$$

$$Q_B = 0.20 \sim 0.80 \quad (4)$$

$$Q_C = 0.20 \sim 0.80 \quad (5)$$

In the present embodiment, the ratios $Q_A$, $Q_B$, and $Q_C$ of the peripheral fluids A, B, and C are set to the above relationships, so that the fluids are mixed at a more optimal flow rate balance, and it becomes possible to form a flame with higher combustion efficiency. That is, as expressed by the above formulas (3) to (5), each fluid can be mixed and combusted at a more optimal flow rate balance by setting the ratio $Q_A$ of the peripheral fluid A initially mixed with the center fluid D ejected from the center fluid ejection outlet 2 to slightly reduced, and the ratio $Q_B$ of the peripheral fluid B and the ratio $Q_C$ of the peripheral fluid C to equal to or greater than the ratio $Q_A$ of the peripheral fluid A.

In the method for heating of the present embodiment, when the flow velocity of the center fluid D ejected from the center fluid ejection outlet 2 is V, and the flow velocities of the peripheral fluids B and C ejected from the second peripheral fluid ejection outlet 4 and the third peripheral fluid ejection outlet 5 are $V_B$ and $V_C$, it is more preferable that V, $V_B$, and $V_C$ satisfy the following formula (6).

$$V \leq V_B \leq V_C \leq 8V \tag{6}$$

In the present embodiment, the flow velocity V of the center fluid D, the flow velocity $V_B$ of the peripheral fluid B, and the flow velocity $V_C$ of the peripheral fluid C are set so as to satisfy the relationship represented by the above formula (6), so that each fluid can be mixed with a more optimal flow velocity balance, and a flame can be formed with better combustion efficiency.

The object to be heated by the method for heating using the burner 1 of the present embodiment is not limited to the intermediate product used in the steel producing process as described above. For example, in the case of heating various objects to be heated that require high temperature and uniform heating, the present invention can be applied without any limitation.

<Effects>

As explained above, the burner 1 of the present embodiment includes: the center fluid ejection outlet 2; the first peripheral fluid ejection outlet 3 arranged around center fluid ejection outlet 2; the second peripheral fluid ejection outlet 4 arranged at a position at which the distance between the center thereof and the center of the center fluid ejection outlet 2 is larger than the distance between the center of the first peripheral fluid ejection outlet 3 and the center of the center fluid ejection outlet 2, and in a direction orthogonal to the expanding direction of the center fluid ejection outlet 2; and the third peripheral fluid ejection outlet 5 arranged at a position at which the distance between the center thereof and the center of the center fluid ejection outlet 2 is larger than the distance between the center of the second peripheral fluid ejection outlet 2 and the center of the center fluid ejection outlet 2, and in the direction orthogonal to the expanding direction of the center fluid ejection outlet 2.

In this manner, in the burner 1 that oscillates the flame by self-induced oscillation, the center fluid ejection outlet 2, and the first peripheral fluid ejection outlet 3 arranged around the center fluid ejection outlet 2 are provided, and the second peripheral fluid ejection outlet 4 and the third peripheral fluid ejection outlet 5 are further provided at optimized position. For this reason, the center fluid D and the peripheral fluids A, B, and C can be mixed and combusted in stages. As a result, the flow rate and flow velocity of each of the peripheral fluids A, B, and C ejected from the first to third peripheral flow outlets 3, 4, and 5 can be adjusted to an optimal balance. Moreover, a favorable combustion state is maintained, and heat transfer efficiency is increased. Even when the oscillation of the flame due to the self-induced oscillation is accelerated, the length of the flame to be formed can be ensured.

Therefore, when heating the object to be heated 50, it is possible to suppress the amount of NOx emission and to uniformly heat the wide area even at a position away from the center axis J of the burner 1.

Moreover, since the method for heating using a burner of the present embodiment is a method for heating using the burner 1 having the above-described configuration, similarly to the above, it is possible to uniformly heat the wide area by the burner with self-induced oscillation and to uniformly heat with excellent heat transfer efficiency even when the object to be heated is arranged at a position away from the center axis J of the burner 1.

EXAMPLES

Hereinafter, the burner and the method for heating using a burner according to the present invention will be described in more detail with reference to Examples, but the present invention is not limited to the following Example, and can be appropriately modified and implemented without changing the gist of the invention.

<Burner Specifications and Operating Conditions>

In Example, a burner 1 having a structure as shown in FIGS. 1 to 4 was prepared, and a combustion test was carried out under the following conditions.

In Example, the opening angle α of the center fluid ejection outlet 2 of the burner 1 shown in FIG. 2 was adjusted to 30°. Further, in Example, the center-to-center distance $L_B$ from the center fluid ejection outlet 2 to the second peripheral fluid ejection outlet 4, and the center-to-center distance $L_{B-C}$ from the second peripheral fluid ejection outlet 4 to the third peripheral fluid ejection outlet 5 were adjusted as shown in Table 1 below.

In Example, propane gas was used as the fuel gas, and oxygen-enriched air having an oxygen enrichment rate of 40% was used as the combustion-supporting gas. The fuel gas was flowed to the center fluid ejection outlet 2, the combustion-supporting gas was flowed to the first peripheral fluid ejection outlet 3, the second peripheral fluid ejection outlet 4 and the third peripheral fluid ejection outlet 5 to form a flame.

Burner operation conditions were as follows: the flow rate of the fuel gas (propane gas) was 13 $Nm^3/h$, the flow rate of the combustion-supporting gas was 170 $Nm^3/h$, and combustion was performed at an oxygen ratio of 1.05. Moreover, the oxygen ratio refers to the proportion of oxygen when the amount of oxygen necessary for complete combustion of the fuel gas was 1.

In addition, the oscillation period of the fuel gas by the self-induced oscillation at the center fluid ejection outlet 2 was 1 second.

<Heating Conditions>

In Example, the convective heat transfer efficiency in two directions orthogonal to the fluid oscillation direction R, that is, two directions orthogonal to the expanding direction of the center fluid ejection outlet 2 was evaluated by measuring the surface temperature of the heat removal body using a heat removal body as an alternative to the object to be heated 50 shown in FIGS. 4 and 5. That is, as shown in FIG. 4, when the equivalent diameter of the center fluid ejection outlet 2 is L, several heat removal bodies were arranged at a position 30 L away from the center of the center fluid ejection outlet 2 toward the lower side of the burner 1, the surface temperature of the heat removal bodies was measured.

In Example, the ratios $Q_A$, $Q_B$, and $Q_C$ of the flow rate of the peripheral fluids A, B, and C ejected from the first to third peripheral fluid ejection outlets 3, 4, 5 with respect to the total flow rate, and the flow velocity V of the center fluid D ejected from the center fluid ejection outlet 2, the flow velocities $V_B$ and $V_C$ of the peripheral fluids B and C ejected from the second peripheral fluid ejection outlet 4 and the third peripheral fluid ejection outlet 5 were adjusted as shown in Table 1 below.

In Example, the combustion state and the amount of NOx emission were evaluated under the above conditions, and the results are shown in Table 1 below. Here, the amount of NOx emission is indicated by a calculated value of 11% oxygen.

In addition, in the evaluation of the combustion state shown in Table 1 below, "Good" indicates that the combustion state is good, and "Inferior" indicates that the combustion state is inferior (there is incomplete combustion and soot is often formed).

Further, in Example, a test was carried out while changing the distance between the burner surface and the measurement surface, the convective heat transfer efficiency in the axial direction of the burner was evaluated. The relationship between the distance from the burner surface and the amount of heat transfer in Examples and Comparative Examples 1, 2, 6, 7, and 9 is shown in the graph of FIG. 6.

TABLE 1

| | $Q_A$ | $Q_B$ | $Q_C$ | $V_A$ | $V_B$ | $V_C$ | $L_B$ | $L_{B-C}$ | Combustion Status | NOx [ppm, 11% $O_2$] |
|---|---|---|---|---|---|---|---|---|---|---|
| Example 1 | 0.05 | 0.25 | 0.7 | V | 6 V | 6 V | 12 L | 8 L | Good | 64 |
| Comparative Example 1 | 1 | 0 | 0 | V | — | — | — | — | Good | 510 |
| Comparative Example 2 | 0.2 | 0.8 | 0 | V | 6 V | — | 12 L | — | Good | 265 |
| Comparative Example 3 | 0.2 | 0 | 0.8 | V | — | 6 V | 12 L | 8 L | Inferior | 62 |
| Comparative Example 4 | 0 | 0.3 | 0.7 | — | 6 V | 6 V | 12 L | 8 L | Inferior | 63 |
| Comparative Example 5 | 0.05 | 0.25 | 0.7 | V | ½ V | 6 V | 12 L | 8 L | Inferior | 75 |
| Comparative Example 6 | 0.05 | 0.25 | 0.7 | V | 8 V | 6 V | 12 L | 8 L | Good | 115 |
| Comparative Example 7 | 0.05 | 0.25 | 0.7 | V | 6 V | 10 V | 12 L | 8 L | Good | 63 |
| Comparative Example 8 | 0.05 | 0.25 | 0.7 | V | 6 V | 6 V | 16 L | 4 L | Inferior | 62 |
| Comparative Example 9 | 0.05 | 0.25 | 0.7 | V | 6 V | 6 V | 12 L | 16 L | Good | 260 |

Figure 6:
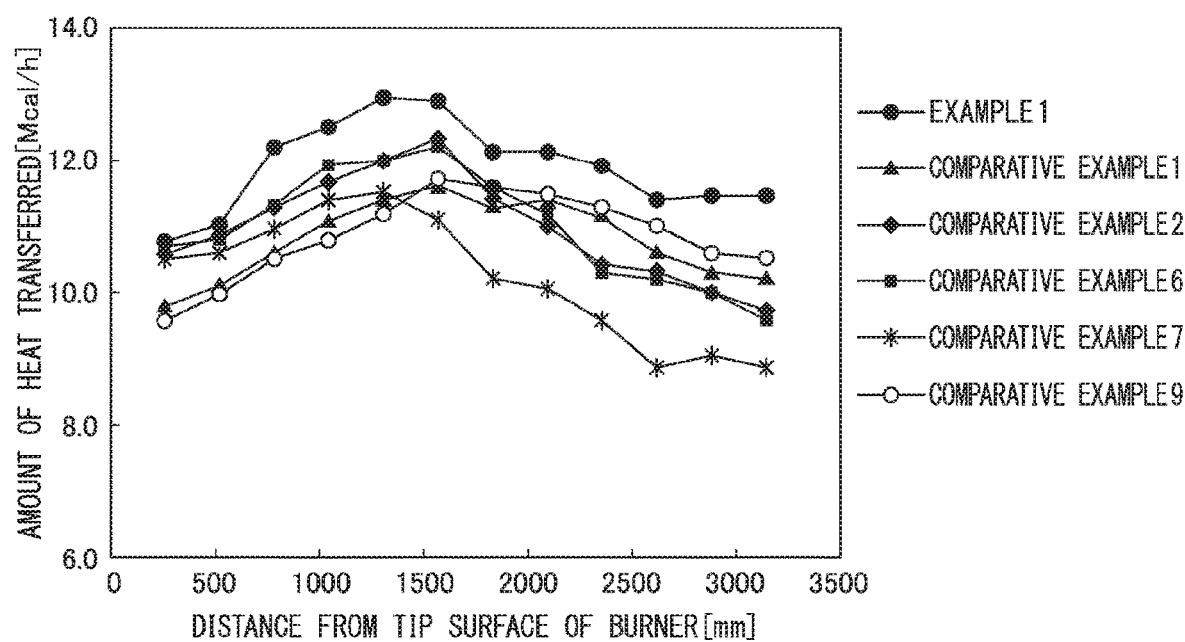
FIG. 6 is a graph showing a relationship between a distance from a tip surface of the burner and an amount of heat transfer in the burner of Example and Comparative Examples.

As shown in the graph of FIG. 6, higher heat transfer efficiency was obtained in Example as compared with Comparative Examples 1, 2, 6, 7, and 9.

It is considered that the fuel gas ejected from the center fluid ejection outlet 2 was mixed with the combustion-supporting gas ejected from the second peripheral fluid ejection outlet 4 to raise the temperature of the flame, the remaining fuel gas was further mixed with the combustion-supporting gas ejected from the third peripheral fluid ejection outlet 5 to raise the temperature of the flame, the high-temperature flame was formed at a position close to the heat removal body, and the radiation heat transfer efficiency was increased.

Further, from the results shown in Table 1, it can be understood that the concentration of the exhausted NOx was also at a low level in Example. It is conceived that this is caused by the effect of so-called staging combustion, in which the combustion-supporting gas is blown into the fuel gas at a high speed from a distance, so that the fuel gas gradually combusts to achieve slow combustion and gradually reduces the amount of NOx generation.

In Comparative Example 1, the evaluation was performed under the same conditions as in Example except that the combustion-supporting gas was ejected from only the first peripheral fluid ejection outlet 3. In other words, in Comparative Example 1, evaluation was carried out under conditions using a conventional self-induced oscillation burner.

As shown in the graph of FIG. 6 and Table 1, in Comparative Example 1, the heat transfer efficiency was low, and the NOx concentration was high compared with the Example.

In Comparative Example 2, the evaluation was performed under the same conditions as in Example except that the combustion-supporting gas was ejected from only the first peripheral fluid ejection outlet 3 and the second peripheral fluid ejection outlet 4.

As shown in the graph of FIG. 6, it can be understood that, in Comparative Example 2, although the heat transfer efficiency was improved compared with Comparative Example 1, the heat transfer efficiency did not reach the heat transfer efficiency in Example. It is conceived that in Comparative Example 2, although a high-temperature flame was formed, the distance between the flame and the heat removal body was large, so that the radiant heat transfer did not increase sufficiently. Further, as shown in Table 1, in Comparative Example 2, the NOx concentration was relatively high.

In Comparative Example 3, the evaluation was performed under the same conditions as in Example except that the combustion-supporting gas was ejected from only the first peripheral fluid ejection outlet 3 and the third peripheral fluid ejection outlet 5.

In Comparative Example 3, it was confirmed that a large amount of soot was formed in the test furnace in which the burner was arranged, and the combustion state was poor as shown in Table 1. It is conceived that the fuel gas ejected from the center fluid ejection outlet 2 was not sufficiently mixed with the combustion-supporting gas ejected from the third peripheral fluid ejection outlet 5, resulting in incomplete combustion.

In Comparative Example 4, the evaluation was performed under the same conditions as in Example except that the combustion-supporting gas was ejected from only the second peripheral fluid ejection outlet 4 and the third peripheral fluid ejection outlet 5.

In Comparative Example 4, as in Comparative Example, 3, it was confirmed that a large amount of soot was formed in the test furnace provided with the burner, and the combustion state was poor as shown in Table 1. The reason for this result was considered to be the same as in Comparative Example 3. In Comparative Example 4, flame holding was insufficient, and it was also confirmed that the flame sometimes blows away.

In Comparative Example 5, the evaluation was performed under the same conditions as in Example except that the ejection velocity (flow velocity $V_B$) of the combustion-supporting gas ejected from the second peripheral fluid ejection outlet 4 was reduced.

In Comparative Example 5, as in Comparative Examples 3 and 4, it was confirmed that a large amount of soot was formed in the test furnace in which the burner was arranged. As shown in Table 1, the combustion state was poor. This reason is considered to be the same as in Comparative Examples 3 and 4.

In Comparative Example 6, the evaluation was performed under the same conditions as in Example except that the flow velocity $V_B$ of the combustion-supporting gas ejected from the second peripheral fluid ejection outlet 4 was increased.

In Comparative Example 6, although there was no problem in the combustion state, the NOx concentration was high. Further, as shown in the graph of FIG. 6, although the heat transfer efficiency was improved to about the heat transfer efficiency in Comparative Example 2, it did not become higher. It is conceived that the flow velocity $V_B$ of the combustion-supporting gas ejected from the second peripheral fluid ejection outlet 4 was too fast compared with the flow velocity $V_C$ of the combustion-supporting gas ejected from the third peripheral fluid ejection outlet 5, so the remaining fuel gas and the combustion-supporting gas ejected from the third peripheral fluid ejection outlet 5 were not sufficiently mixed.

In Comparative Example 7, the evaluation was performed under the same conditions as in Example except that the flow velocity $V_C$ of the combustion-supporting gas ejected from the third peripheral fluid ejection outlet 5 was increased.

In Comparative Example 7, there was no problem in the combustion state, and the NOx concentration was also suppressed. However, as shown in the graph of FIG. 6, the heat transfer efficiency was reduced compared with Comparative Example 1 described above, that is, when a conventional burner was used. It is conceived that the flow velocity $V_C$ of the combustion-supporting gas ejected from the third peripheral fluid ejection outlet 5 was too fast, so the contribution of convection heat transfer was increased, the combustion-supporting gas was collided with the heat removal body before forming a high-temperature flame, and conversely, the action of taking heat away from the heat removal body became larger.

In Comparative Example 8, the evaluation was performed under the same conditions as in Example except that the center-to-center distance $L_B$ between the center fluid ejection outlet 2 and the second peripheral fluid ejection outlet 4 was increased.

In Comparative Example 8, it was confirmed that a large amount of soot was formed in the test furnace in which the burner was arranged, and the combustion state was poor as shown in Table 1. This reason is considered to be the same as in Comparative Example 3 and the like.

In Comparative Example 9, the evaluation was performed under the same conditions as in Example except that the center-to-center distance $L_{B\text{-}C}$ between the second peripheral fluid ejection outlet 4 and the third peripheral fluid ejection outlet 5 was increased.

In Comparative Example 9, as shown in the graph of FIG. 6, the heat transfer efficiency was reduced compared with Comparative Example 1 described above, that is, when a conventional burner was used. It is conceived that the same action as in the case of Comparative Example 7 occurred because the distance between the combustion-supporting gas ejected from the third peripheral fluid ejection outlet 5 and the heat removal body was too short.

From the results described above, it can be understood that the burner according to the Example can improve the radiant heat transfer efficiency and reduce the amount of NOx emission compared with the self-induced oscillation burner having the conventional structure. Therefore, it is clear that when the burner according to the Example and the method for heating using a burner are applied to, for example, a heating furnace used in a steel producing process, even at a position away from the center axis of the burner, it is possible to heat uniformly over a wide area while suppressing the amount of NOx emission.

INDUSTRIAL APPLICABILITY

When heating the object to be heated while oscillating the flame by self-induced oscillation, the burner and the method for heating using a burner of the present invention can heat uniformly with excellent heat transfer efficiency even at a position away from the center axis of the burner. Therefore, the burner and the method for heating using a burner according to the present invention is very suitable for the various uses which heat an object to be heated using a burner other than the heating furnace etc. which are used in a steel producing process.

EXPLANATION OF REFERENCE NUMERAL 1 burner
2 center fluid ejection outlet
3 first peripheral fluid ejection outlet
4 second peripheral fluid ejection outlet
5 third peripheral fluid ejection outlet
6 fluid ejection flow path
  6a introduction port
  61 (a pair of) side walls
  62a, 62b (a pair of) first and second openings
  63a first side wall
  63b second side wall
  64 (rectangular tube-shaped) flow path
7 communication pipe
50 object to be heated
D center fluid (fuel gas)
A, B, C peripheral fluid (combustion-supporting gas)
J center axis (of ejection direction of fluid in center fluid ejection outlet)
S center line (center line orthogonal to expanding direction of center fluid ejection outlet)
L equivalent diameter of center fluid ejection outlet
$L_B$ center-to-center distance from the center fluid ejection outlet to the second peripheral fluid ejection outlet
$L_{B\text{-}C}$ center-to-center distance from the second peripheral fluid ejection outlet to the third peripheral fluid ejection outlet
$Q_A$, $Q_B$, $Q_C$ ratio of flow rate of each peripheral fluid with respect to total flow rate of peripheral fluids
V, $V_B$, $V_C$ flow velocity (of center fluid or peripheral fluid)

The invention claimed is:
1. A burner which is configured eject a combustion-supporting gas containing oxygen or a fuel gas from each of a plurality of fluid ejection outlets provided at the tip surface thereof, and burns them,
  wherein a plurality of the fluid ejection outlets comprise a center fluid ejection outlet, a first peripheral fluid ejection outlet, a second peripheral fluid ejection outlet, and a third peripheral fluid ejection outlet, a pair of openings are provided at positions facing each other on side walls of a fluid ejection flow path on an upstream side of the center fluid ejection outlet, a pair of the openings are communicated with each other through a communication pipe, a downstream side of the opening in the fluid ejection flow path has a cross-sectional fan shape in which an interval between a pair of the side walls at which the openings are arranged gradually expands toward the downstream side, the first peripheral fluid ejection outlet is arranged around the center fluid ejection outlet, the second peripheral fluid ejection outlet is arranged at a position at which a distance between a center thereof and a center of the center fluid ejection outlet is larger than a distance between a center of the first peripheral fluid ejection outlet and the center of the center fluid ejection outlet, and in a direction orthogonal to an expanding direction of the center fluid ejection outlet, the third peripheral fluid ejection outlet is arranged at a position at which a distance between a center thereof and the center of the center fluid ejection outlet is larger than the distance between the center of the second peripheral fluid ejection outlet and the center of the center fluid ejection outlet, and in the direction orthogonal to the expanding direction of the center fluid ejection outlet, and when an equivalent diameter of the center fluid ejection outlet is L, a center-to-center distance from the center fluid ejection outlet to the second peripheral fluid ejection outlet is $L_B$ and a center-to-center distance from the second peripheral fluid ejection outlet to the third peripheral fluid ejection outlet is $L_{B-C}$, L, $L_B$, and $L_{B-C}$ satisfy the following expressions (1) and (2).

$$L_B \leq 15L \qquad (1)$$

$$L_{B-C} \leq 15L \qquad (2)$$

2. The burner according to claim 1, wherein the second peripheral fluid outlet and the third peripheral fluid outlet are arranged respectively in a plurality along the expanding direction of the center fluid ejection outlet.

3. A method for heating using a burner, wherein an object to be heated is heated using the burner according to claim 1, when a fluid ejected from the first peripheral fluid ejection outlet, the second peripheral fluid ejection outlet, and the third peripheral fluid ejection outlet is a peripheral fluid A, a peripheral fluid B, and a peripheral fluid C, when ratios of a flow rate of the peripheral fluids A, B, and C with respect to a total flow rate of the peripheral fluids A, B, and C are $Q_A$, $Q_B$, and $Q_C$, and these ratios are in ranges represented by the following formulas (3), (4) and (5), respectively.

$$Q_A = 0.05 \sim 0.20 \qquad (3)$$

$$Q_B = 0.20 \sim 0.80 \qquad (4)$$

$$Q_C = 0.20 \sim 0.80 \qquad (5)$$

4. The method for heating using a burner according to claim 3, wherein when a flow velocity of a center fluid D ejected from the center fluid ejection outlet is V, and flow velocities of the peripheral fluids B and C ejected from the second peripheral fluid ejection outlet and the third peripheral fluid ejection outlet are $V_B$ and $V_C$, V, $V_B$, and $V_C$ satisfy the following formula (6).

$$V \leq V_B \leq V_C \leq 8V \qquad (6)$$

* * * * *